US010949449B2

(12) United States Patent
Raviv et al.

(10) Patent No.: US 10,949,449 B2
(45) Date of Patent: Mar. 16, 2021

(54) SYSTEMS AND METHODS FOR EFFICIENT ELECTRONIC MESSAGE STORAGE AND RETRIEVAL

(71) Applicant: Oath Inc., New York, NY (US)

(72) Inventors: Ariel Raviv, Haifa (IL); Irena Grabovitch-Zuyev, Naharya (IL); Joel Oren, Tel Aviv (IL)

(73) Assignee: Verizon Media Inc., New York, NY (US)

( * ) Notice: Subject to any disclaimer, the term of this patent is extended or adjusted under 35 U.S.C. 154(b) by 146 days.

(21) Appl. No.: 16/365,830

(22) Filed: Mar. 27, 2019

(65) Prior Publication Data

US 2020/0311104 A1 Oct. 1, 2020

(51) Int. Cl.
*G06F 16/28* (2019.01)
*H04L 12/58* (2006.01)
*G06F 16/22* (2019.01)

(52) U.S. Cl.
CPC .......... *G06F 16/285* (2019.01); *G06F 16/22* (2019.01); *H04L 51/22* (2013.01)

(58) Field of Classification Search
None
See application file for complete search history.

(56) References Cited

U.S. PATENT DOCUMENTS

| 8,738,721 | B1* | 5/2014 | Smirnov | G06Q 10/107 709/206 |
| 10,021,054 | B1* | 7/2018 | Zhou | G06Q 10/107 |
| 2018/0054414 | A1* | 2/2018 | LeVasseur | G06F 21/606 |
| 2018/0183619 | A1* | 6/2018 | Jayaram | H04W 12/02 |
| 2020/0226214 | A1* | 7/2020 | Reddekopp | G06F 16/213 |
| 2020/0257714 | A1* | 8/2020 | Grabovitch-Zuyev | G06F 16/345 |

* cited by examiner

*Primary Examiner* — Uyen T Le
(74) *Attorney, Agent, or Firm* — Cooper Legal Group, LLC

(57) ABSTRACT

One or more computing devices, systems, and/or methods for efficiently storing and retrieving electronic communication are provided. Messages with the same structure are grouped into a same cluster. A template is created for the cluster. The template is populated with constant values that are the same amongst the messages. Variable values that are different amongst the messages are stored within user account repositories for each message. In this way, the constant values are merely stored once for the messages within the cluster. A template within a general repository and variable values within a user account repository may be used to reconstruct a message.

20 Claims, 10 Drawing Sheets

SYSTEMS AND METHODS FOR EFFICIENT ELECTRONIC MESSAGE STORAGE AND RETRIEVAL

BACKGROUND

A messaging service, such as an email service, may provide users with the ability to send, receive, store, and retrieve messages. The messaging service may store messages associated with user accounts within storage devices. Thus, when a user requests a particular message, the message can be retrieved from a storage device by a server of the messaging service. The messaging service may store messages for a large number of users, such as millions of users, which have been accumulated over time by the users. Many messages may be unopened messages that users never read and/or messages that user never deleted. Storing each instance of every message for every user in perpetuity can consume a large amount of storage space. This increases maintenance overhead of managing and maintaining all the necessary storage devices, energy consumption by the storage devices, and infrastructure cost of the storage devices. Many of these messages may be machine generated messages where most of the content between each message is the same (e.g., flight itinerary emails where most of the message body is the same other than a flight number, date, and user name; promotional messages where only a user name or account number is different; etc.). Thus, a lot of storage space is inefficiently utilized because a substantial amount of redundant message content is stored.

SUMMARY

In accordance with the present disclosure, one or more computing devices and/or methods for efficient electronic message storage and retrieval are provided. Many messages may comprise similar content, such as machine generated messages where only certain information is changed between messages (e.g., a purchase receipt, a travel reservation, an event notification, a social notification, a promotions, etc. where only a user name, an account number, a date, or other select information is different between each message). Accordingly, content that is similar between each message is stored once, while content that is different between each message is stored for each message. This drastically reduces the amount of storage space used to store the messages because message content is not redundantly stored.

In an example, messages are clustered into clusters of messages having the same structure (e.g., the same document object model structure). For example, signatures of the messages are calculated to identify messages with the same structure. A signature of a message can be calculated by generating a hash of element paths (xpaths) corresponding to a concatenation of tags of nodes within a document object model tree for elements within the message. Messages having the same signature are deemed to have the same structure. For a cluster of messages having the same structure, a data structure is created for the messages, such as a table where rows correspond to messages and columns correspond to element paths of each element of a message. Values of elements associated with the element paths are populated within the table (e.g., a message may comprise an element path corresponding to a text element of the message, and thus text of the text element is populated within the table for the message and the element path). The table can be evaluated to identify constant elements corresponding to element paths having the same value across the messages. The table can be evaluated to identify variable elements corresponding to element paths having different values across the messages.

A template comprising the element paths of the constant elements, element paths of the variable elements, and the constant values for the content elements is created for the cluster. However, the template does not comprise the variable values for the variable elements of the messages. Instead, the variable values of a message associated with a user account is stored within a user account repository for that user account. In this way, the constant values that are the same across each message of the cluster are merely stored once within the template, while variable values unique to each message of the cluster are stored for each message. The cluster is assigned a cluster identifier corresponding to the signature of the messages.

When a message is received, a signature of the message is generated to determine whether any cluster has a cluster identifier matching the signature. If a cluster is identified, then the template of the cluster is retrieved to identify variable elements and constant elements. Variable values of the variable elements are extracted from the message and are stored in an entry within a user account repository of a user account associated with the message. The entry is also populated with a message identifier of the message and a cluster identifier of the cluster. In this way, merely the variable values are stored and the constant values are not redundantly stored but can be subsequently retrieved from the template using the cluster identifier. If no cluster is identified, then the entire message content is stored within the user account repository.

Similarly, when a request for a message is received, a signature of the message is used to determine whether any cluster has a cluster identifier matching the signature. If a cluster is identified, then the constant values of constant elements of the message are extracted from a template of the cluster and variable values of variable elements are extracted from the user account repository for reconstructing the message. If no cluster is identified, then the entire message content is retrieved from the user account repository for reconstructing the message.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
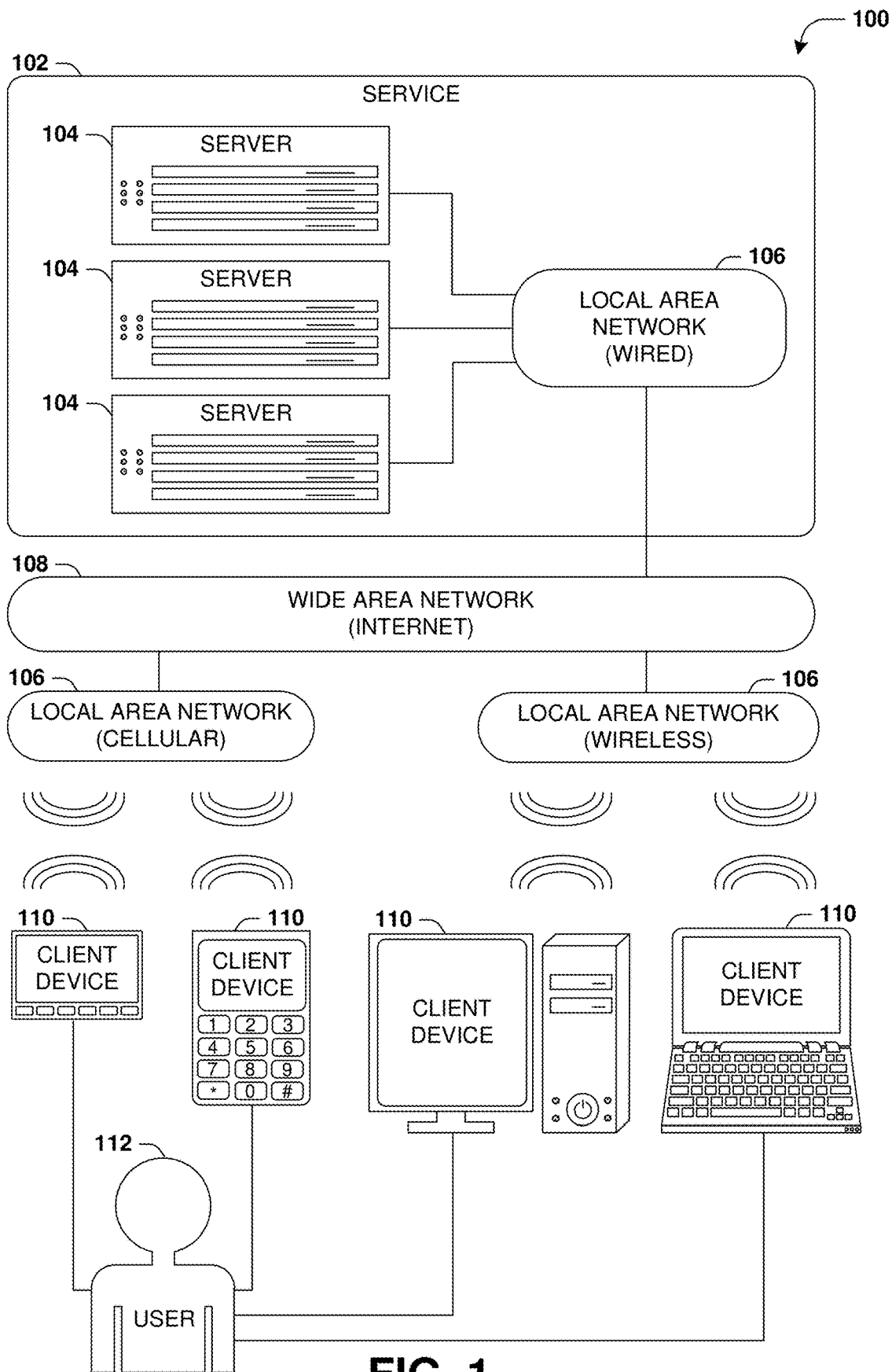
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
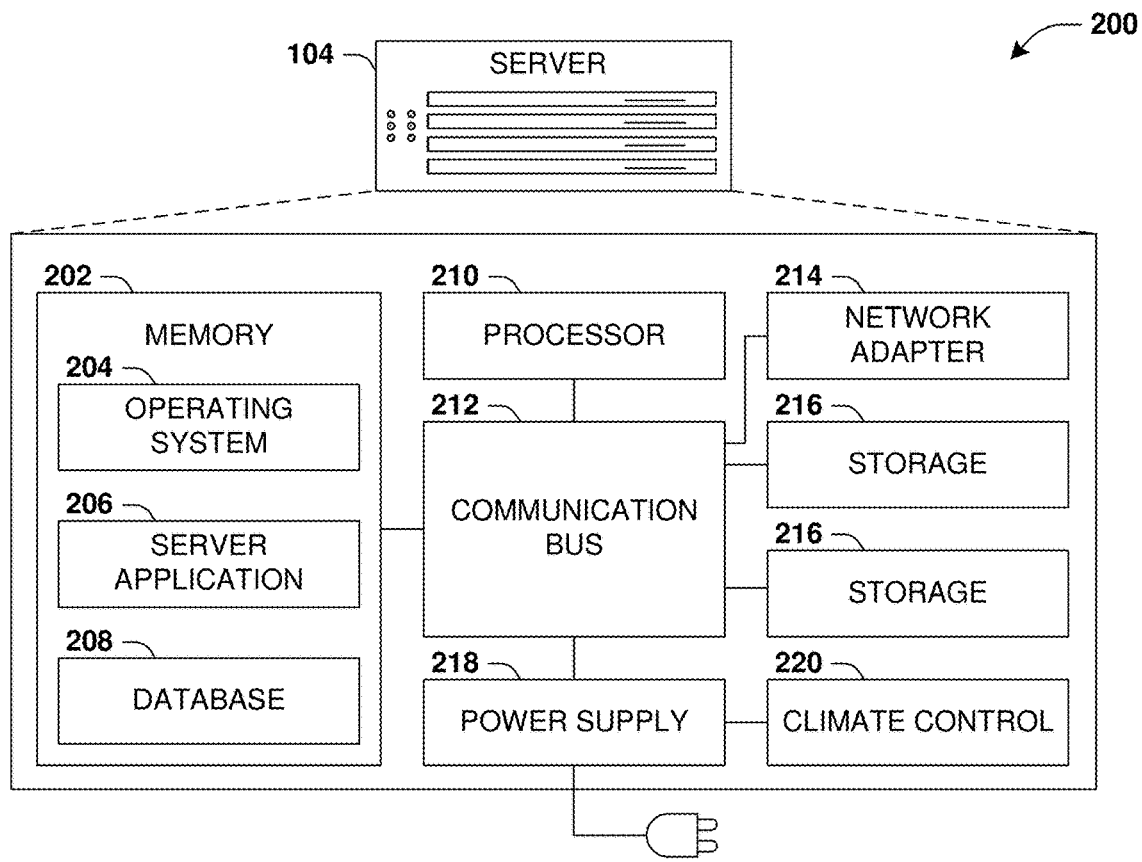
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
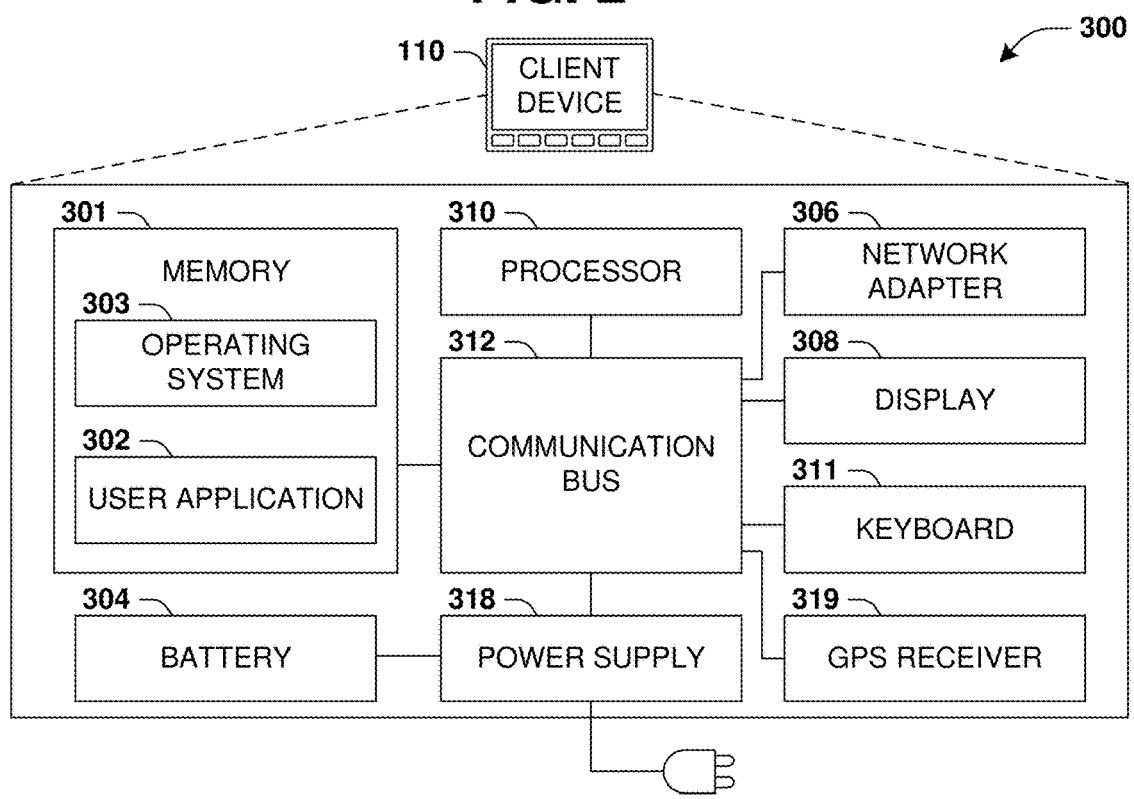
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for efficient electronic message storage and retrieval are provided. In particular, a message service may store messages for a large number of user accounts over time (e.g., an email service, a social network service, etc.). This can result is a substantial amount of storage resource utilization, maintenance overhead, infrastructure cost, energy consumption, etc. Because many message may comprise similar content, a lot of storage space is wasted in store redundant message content.

Accordingly, as provided herein, message content that is the same across messages having the same structure is stored merely once within templates. Message content that is different across the messages have the same structure is stored for each message within user account repositories of user accounts associated with each message. In this way, each message can be represented and reconstructed using constant values within the templates and variable values within user account repositories, while merely storing the constant values once. This improves the efficiency of computing devices hosting the message service, along with reducing storage resource utilization, maintenance overhead, infrastructure costs, energy consumption, etc.

Figure 4:
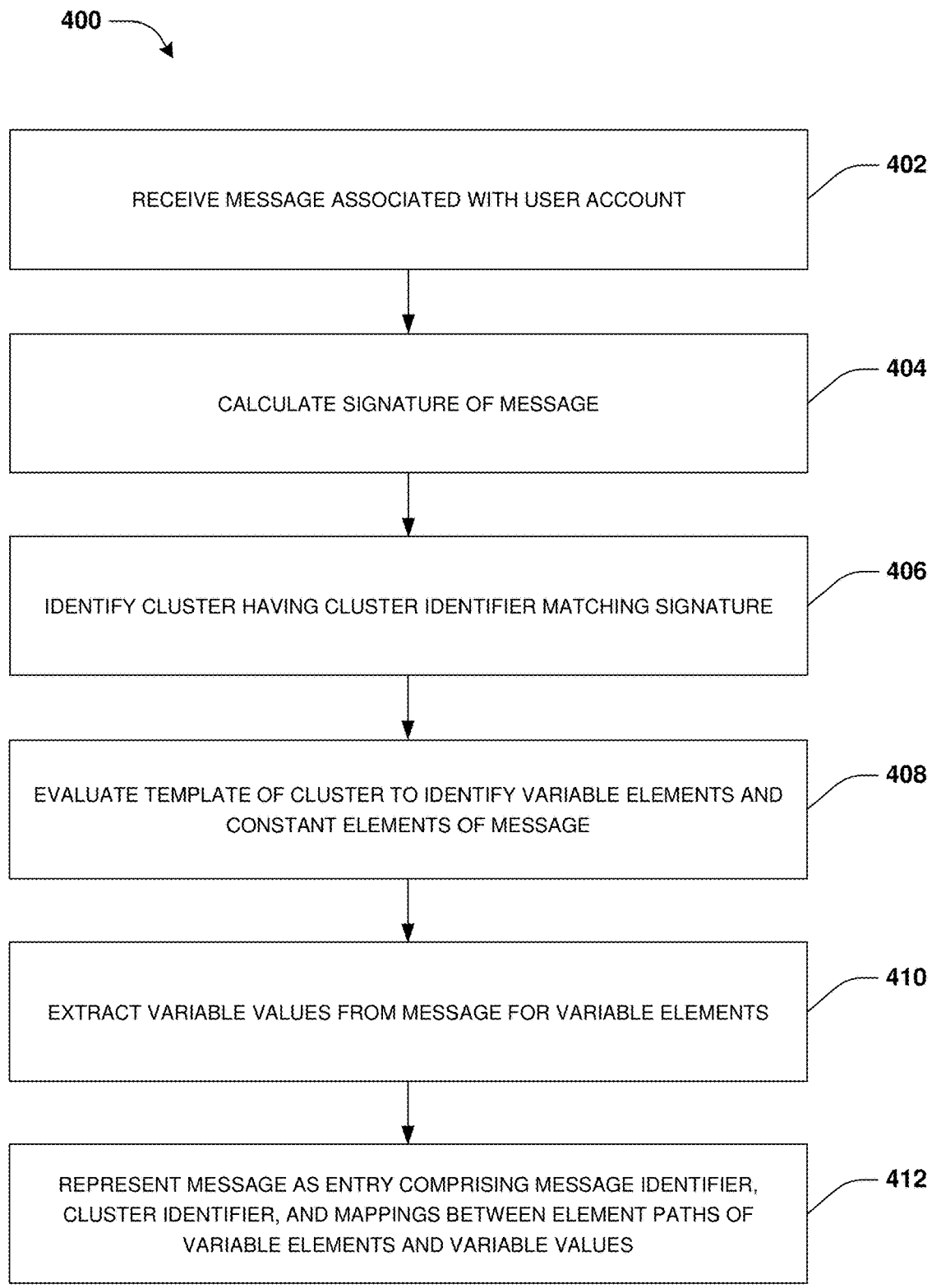
FIG. 4 is a flow chart illustrating an example method for efficient storage and retrieval of electronic messages.

An embodiment of efficient storage and retrieval of electronic messages is illustrated by an example method 400 of FIG. 4, which is described in conjunction with system 500 of FIGS. 5A-5F. A message may correspond to an email, a social network post, a text message, or any other type of content (e.g., an image, text, video, audio, etc.) that may be transmitted between computing devices of users for communication purposes. Messages with the same structure may be clustered together so that content that is the same among the messages of a cluster is stored merely once within a template of the cluster.

Figure 5A:
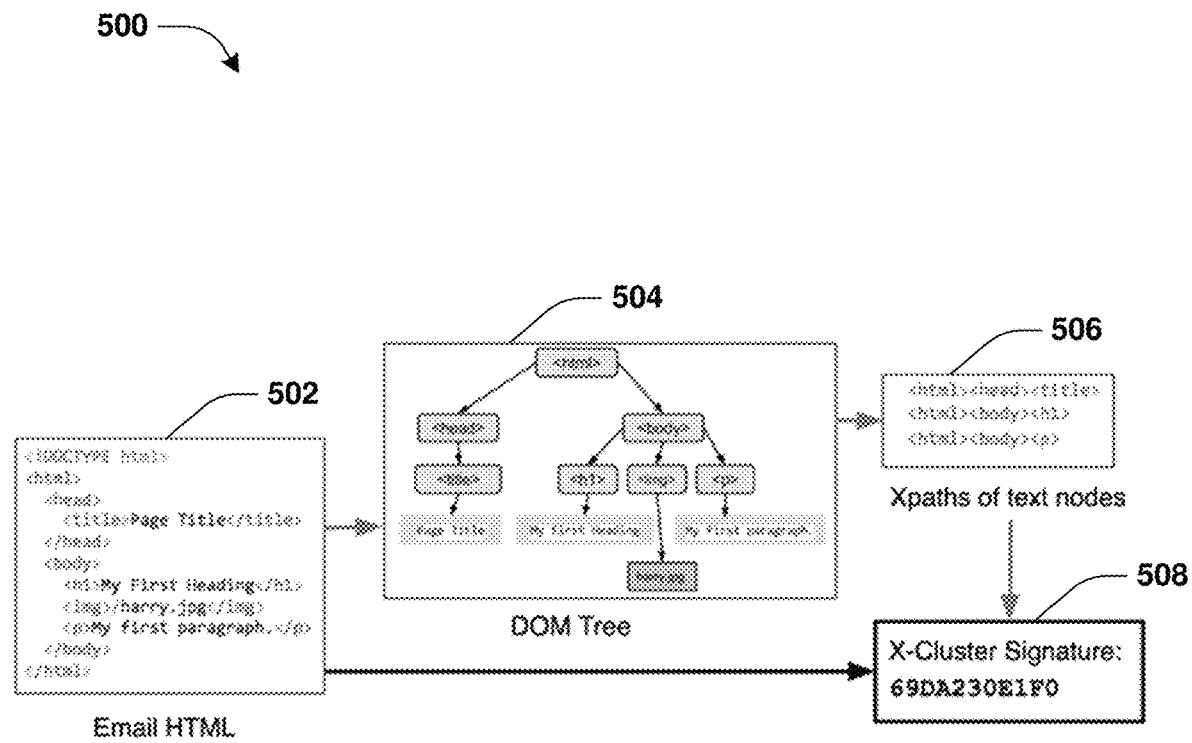
FIG. 5A is a component block diagram illustrating an example system for efficient storage and retrieval of electronic messages, where a signature is calculated for a message.

In an example, a message comprises an email message composed of email Hypertext Markup Language (HTML) 502, as illustrated in FIG. 5A. The email HTML 502 may be represented as a document object model (DOM) tree 504. The DOM tree 504 comprises a root node, intermediate nodes, and leaf nodes, which represent elements of the message. Element paths 506 (xpaths) are used to navigate the DOM tree 504 from the root node to leaf nodes representing elements of the message (e.g., leaf nodes representing text elements within the message). An element path of an element may comprise a concatenation of HTML tags of nodes that are traversed from the root node to a leaf node representing the element. The element paths 506 correspond to a structure of the message. A signature 508 of the message can be calculated based upon the element paths 506 of the elements of the message, such as by calculating a hash of the element paths 506. If two messages have the same signature, then the two messages have the same element paths (xpaths) and thus the same DOM structure.

Figure 5B:
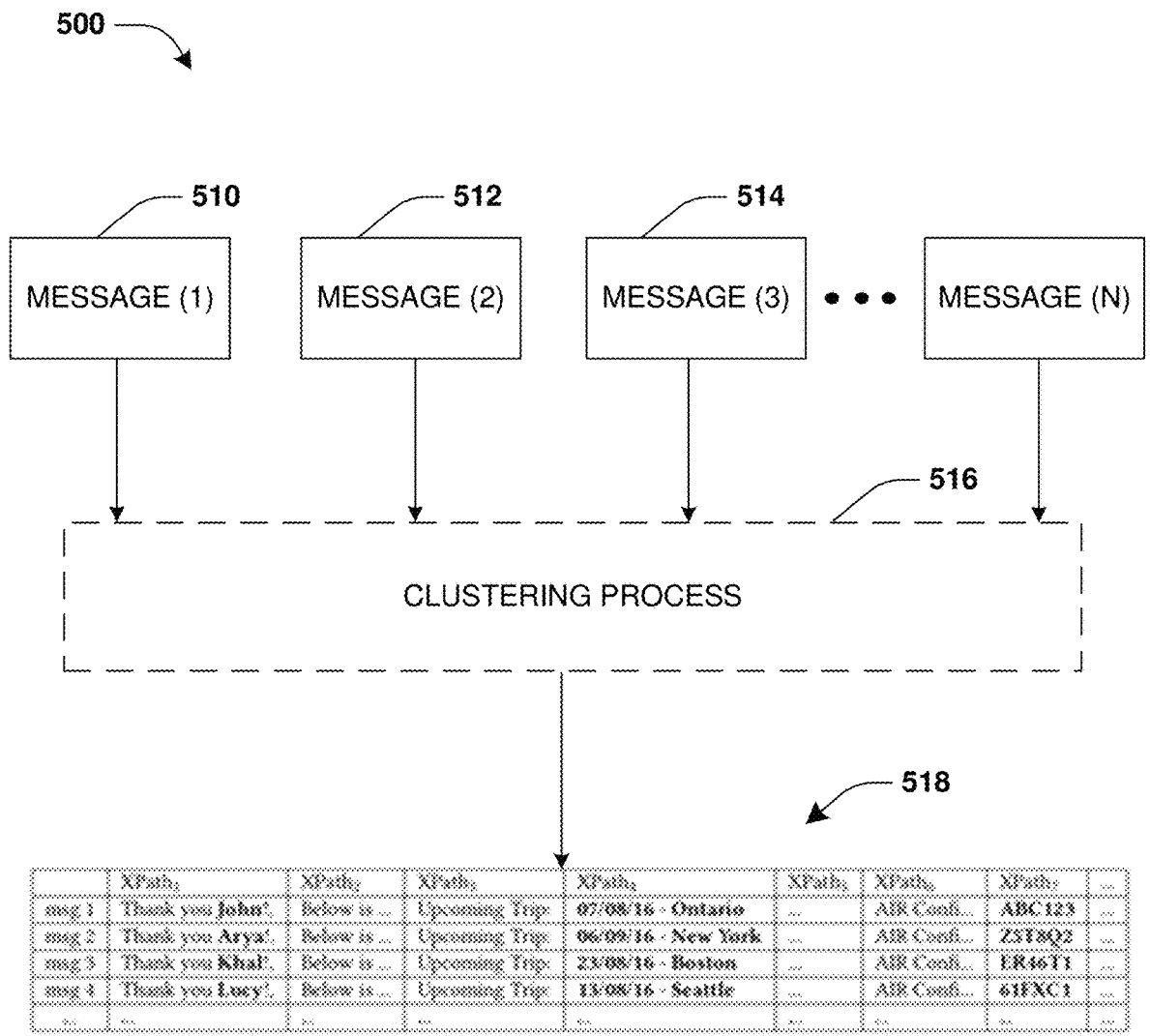
FIG. 5B is a component block diagram illustrating an example system for efficient storage and retrieval of electronic messages, where messages are clustered.

Messages with the same signature (e.g., same DOM structure), such as a first message 510, a second message 512, a third message 514, and/or other messages may be clustered together by a clustering process 516, as illustrated by FIG. 5B. The clustering process 516 may be executed based upon a threshold number of messages having the same signature. The threshold number may be set based upon efficiency (e.g., processing too many messages may be inefficient) and/or precision (e.g., processing too little messages may not result in correct clusters and templates for those clusters). The cluster process 516 may cluster the messages having the same signature into a new cluster.

The clustering process 516 generates a structure 518, such as a table, representing the messages and the element paths 506 (xpaths) of elements within the messages of the new cluster. The structure 518 may comprise rows representing messages. The structure 518 may comprise columns representing the element paths 506 (xpaths) of elements of each message. Values of each element may be populated within the structure 518. For example, the first message 510 may comprise a "Thank you John" text value for a first element path of a first element, a "Below is . . . " text value for a second element path of a second element, a "Upcoming Trip:" text value for a third element path of a third element, a "Jul. 8, 2016—Ontario" text value for a fourth element path of a fourth element, etc. The second message 512 may comprise a "Thank you Arya" text value for the first element path of the first element, a "Below is . . . " text value for the second element path of the second element, a "Upcoming Trip:" text value for the third element path of the third element, a "Jun. 9, 2016—New York" text value for the fourth element path of the fourth element, etc.

The structure 518 is evaluated to identify variable elements and constant elements of the messages. A variable element is identified where values for an element path are different amongst the messages, such as where the first element path has different values amongst the messages. For example, "Thank you John" text value of the first message 510 is different than the "Thank you Arya" text value of the second message 512 for the first element path. "Jul. 8, 2016—Ontario" text value of the first message 510 for the fourth element path is different than the "9, 2016—New York" of the second message 512 for the fourth element path. A constant element is identified where values of an element path are the same amongst the messages, such as all the messages having the "Below is . . . " text value for the second element path, the "Upcoming Trip:" text value for the third element path, etc.

A new template may be generated for the new cluster. The new template comprises element paths (xpaths) of the constant elements (e.g., the second element path, the third element path, etc.), element paths (xpaths) of the variable elements (e.g., the first element path, the fourth element path, etc.), and constant values for the constant elements path (e.g., "Below is . . . " for the second element path, "Upcoming Trip:" for the third element path, etc.). However, the new template does not comprise variable values for the variable elements, but merely comprises a list of the element paths (xpaths) of the variable elements. The new template may be stored with other templates within a general repository 528. In particular, an entry for the new cluster may be created within the general repository 528. The entry comprises a cluster identifier of the new cluster (e.g., the signature of the messages within the new cluster), the template (e.g., the constant values), and the list of the variable path elements of the variable elements). Entries may be generated within user account repositories of user accounts associated with the messages. The entries may comprise variable values for the variable elements of the messages. For example, the first message may be associated with a first user account. An entry may be created within a first user account repository for the first user account. The entry may represent the first message, and may comprise a message identifier of the first message, a cluster identifier of the new cluster, and mappings between element paths of the variable elements and the variable values of the variable elements. In this way, the variable values are stored through the mappings within the user account repository for subsequent reconstruction of the first message.

Figure 5C:
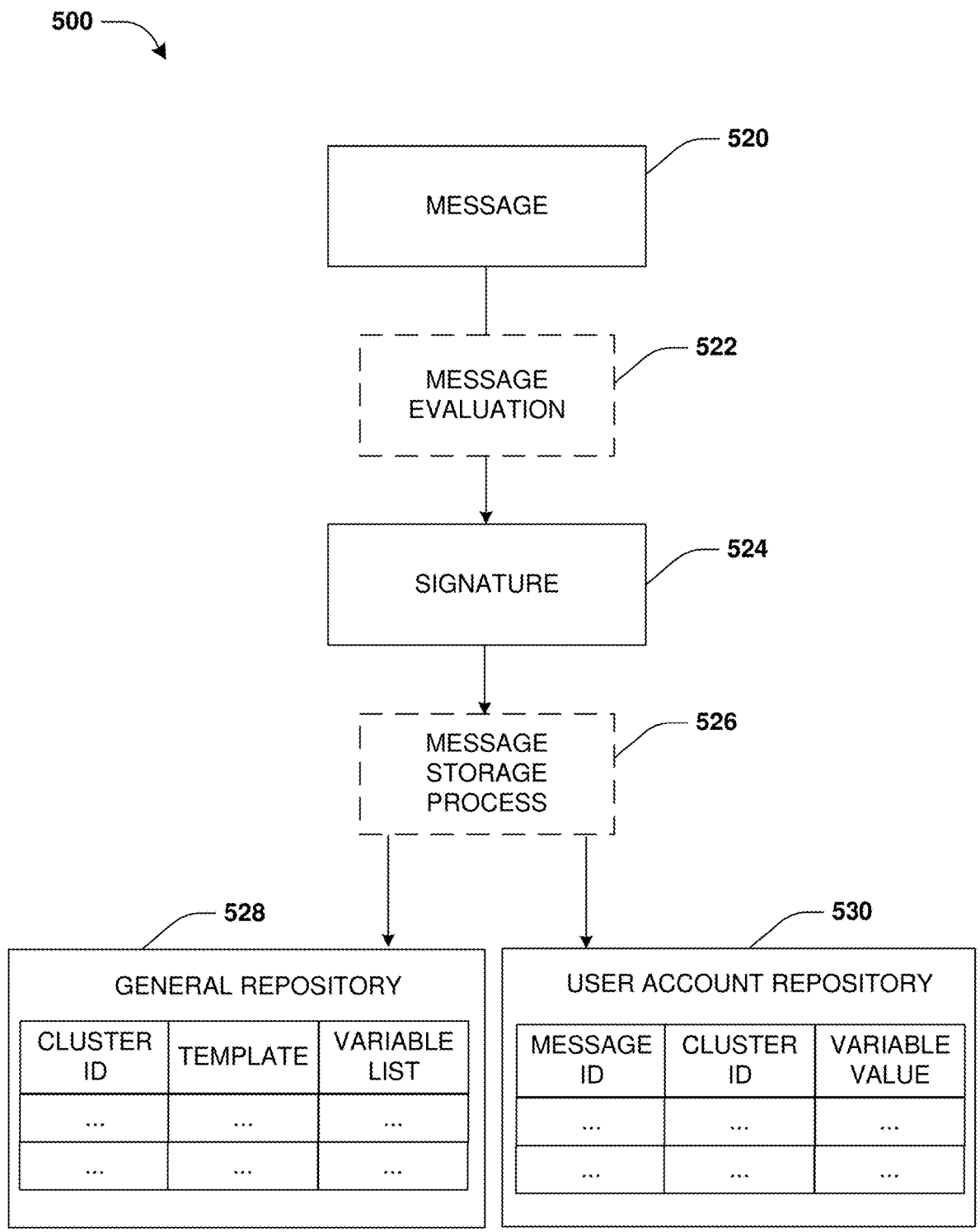
FIG. 5C is a component block diagram illustrating an example system for efficient storage and retrieval of electronic messages, where a message is stored based upon the message matching a template within a general repository.

In an example, incoming messages may be stored within the general repository 528 and user account repositories for subsequent reconstruction and retrieval. At 402, a message 520 is received, as illustrated in FIG. 5C. For example, the message 520 may be associated with a user account of a user with a messaging service, such as an email service (e.g., the user may be receiving the message from another user such as a machine generated invoice from a retail store). As opposed to merely storing the entire message 520 within storage, the message 520 is evaluated 522 to determine whether the message 520 comprises similar content of other clustered messages associated with templates within the general repository 528. At 404, a signature 524 of the message 502 is calculated based upon a structure of the message 520, such as by using the technique previously described in conjunction with FIG. 5A. For example, element paths (xpaths) of the message 520 may be extracted from a document object model tree of HTML of the message 520. A hash of the element paths (xpaths) is calculated as the signature 524, and thus the signature 524 is based upon the structure of the message 520 as opposed to the content (e.g., text) within the message 520.

At 406, the general repository 528 is searched, such as by a message storage process 526, using the signature 524 to determine whether a cluster identifier of a cluster within the general repository 528 matches the signature 524. In an example, a first cluster is identified has having a cluster identifier matching the signature 524. Accordingly, a template of the first cluster is evaluated to identify variable elements (e.g., elements of the message 520 identified by variable xpaths within the variable list of variable element paths) and constant elements (e.g., elements of the message 520 identified by constant xpaths having constant values specified by the template), at 408. The template may comprise constant values of the constant elements that have the same value across all messages within the first cluster. However, the template does not comprise variable values of the variable elements that have different values across messages within the first cluster.

At 410, variable values are extracted from the message 520. The variable values may be values (e.g., text) for variable elements of the message 520 identified by variable xpaths specified by the template. At 412, the message 520 is represented within a user account repository 530 of the user account as an entry. The entry comprises a message identifier of the message, the cluster identifier of the first cluster comprising the template, and mappings between element paths (xpaths) of the variable elements and the variable values. In this way, merely the variable values are stored for the message 520 within the user account repository 530, and the constant values are not redundantly stored because the constant values are already stored within the template. Thus, the template and the entry can be used to reconstruct the message.

Figure 5D:
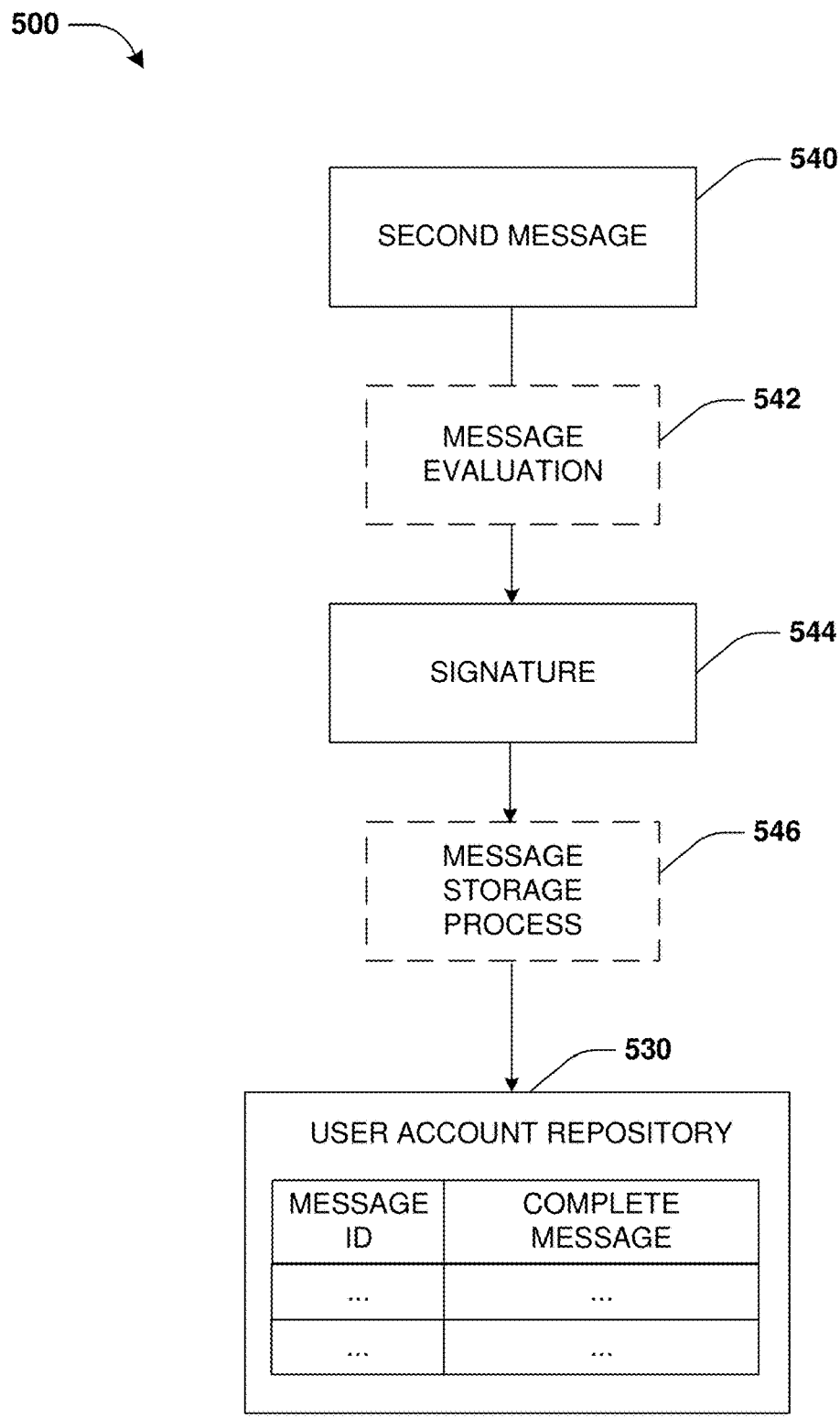
FIG. 5D is a component block diagram illustrating an example system for efficient storage and retrieval of electronic messages, where the entire content of a message is stored within a user account repository based upon the message not matching a template within a general repository.

FIG. 5D illustrates a second message 540 being received for the user account. The second message 540 is evaluated 542 to calculate a signature 544 of the second message 540. A message storage process 546 may determine that the general repository 528 does not comprise any cluster identifiers matching the signature 544. Thus, there is no cluster of messages with the same structure as the second message 540, and thus there is no template for the second message 540. Accordingly, the entire contents of the second message 540 is stored along with a message identifier of the second message 540 within the user account repository 548 for the user account.

Figure 5E:
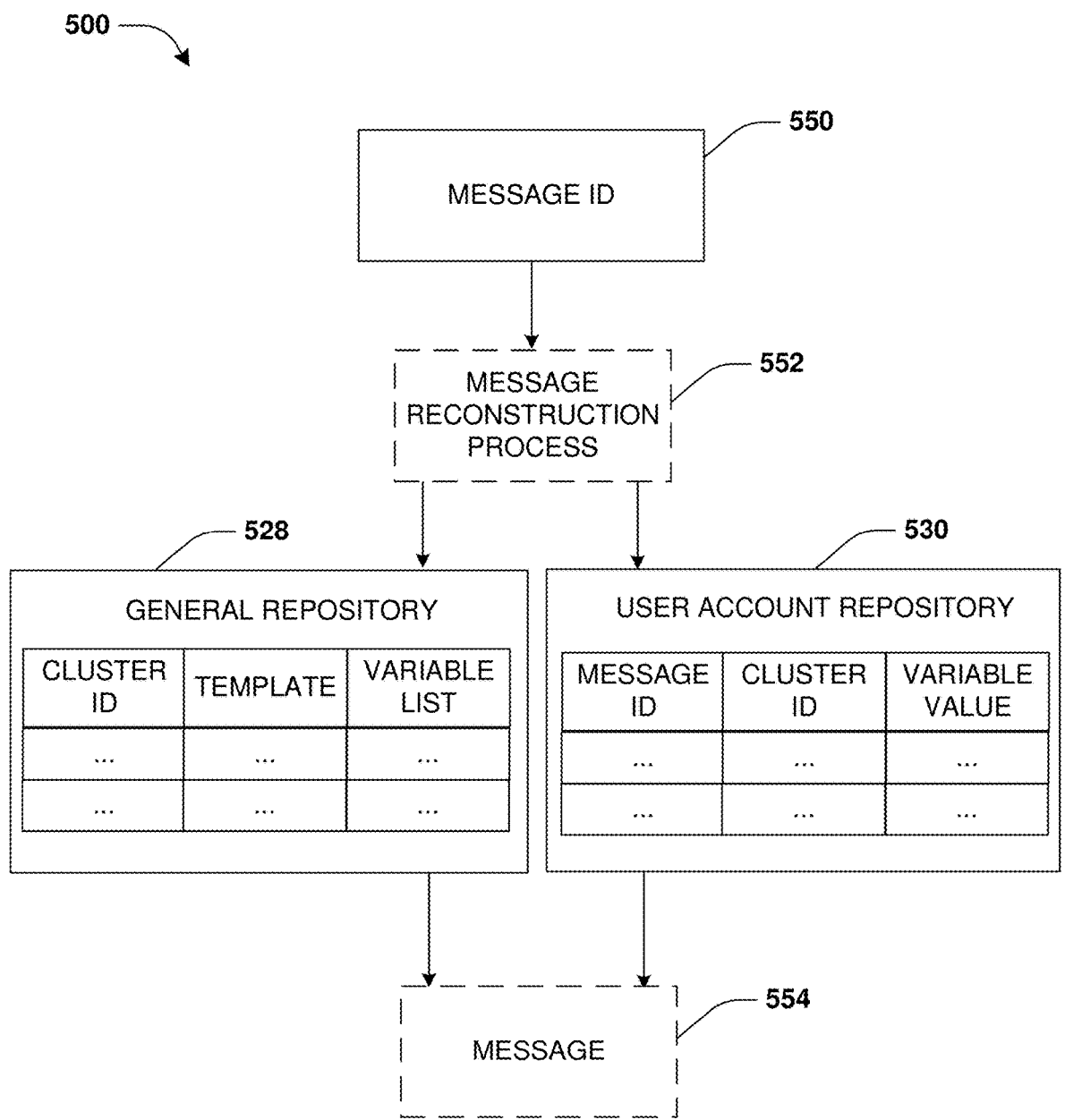
FIG. 5E is a component block diagram illustrating an example system for efficient storage and retrieval of electronic messages, where a message is retrieved.

FIG. 5E illustrates a request, comprising a message identifier 550 of a message 554, being received by a message reconstruction process 552 (e.g., a user is attempting to read a saved email of a user account the user has with a messaging service). The message identifier 550 is used to identify an entry within the user account repository 530 that matches the message identifier 550. The entry may comprise the message identifier 550, a cluster identifier, and a mapping between element paths of variable elements and variable values. The cluster identifier is used to obtain a template, of a cluster having the same cluster identifier as the entry, from the general repository 528. The template comprises variable elements (e.g., element paths such as xpaths of the variable elements), constant elements, and constant values for the constant elements.

The message 554 is reconstructed using the variable elements and the constant elements identified by the template. In particular, the constant values are populated from the template into the constant elements. The variable values from the entry within the user account repository 530 are populated into the variable elements. In this way, the message 554 is reconstructed and provided to the user.

Figure 5F:
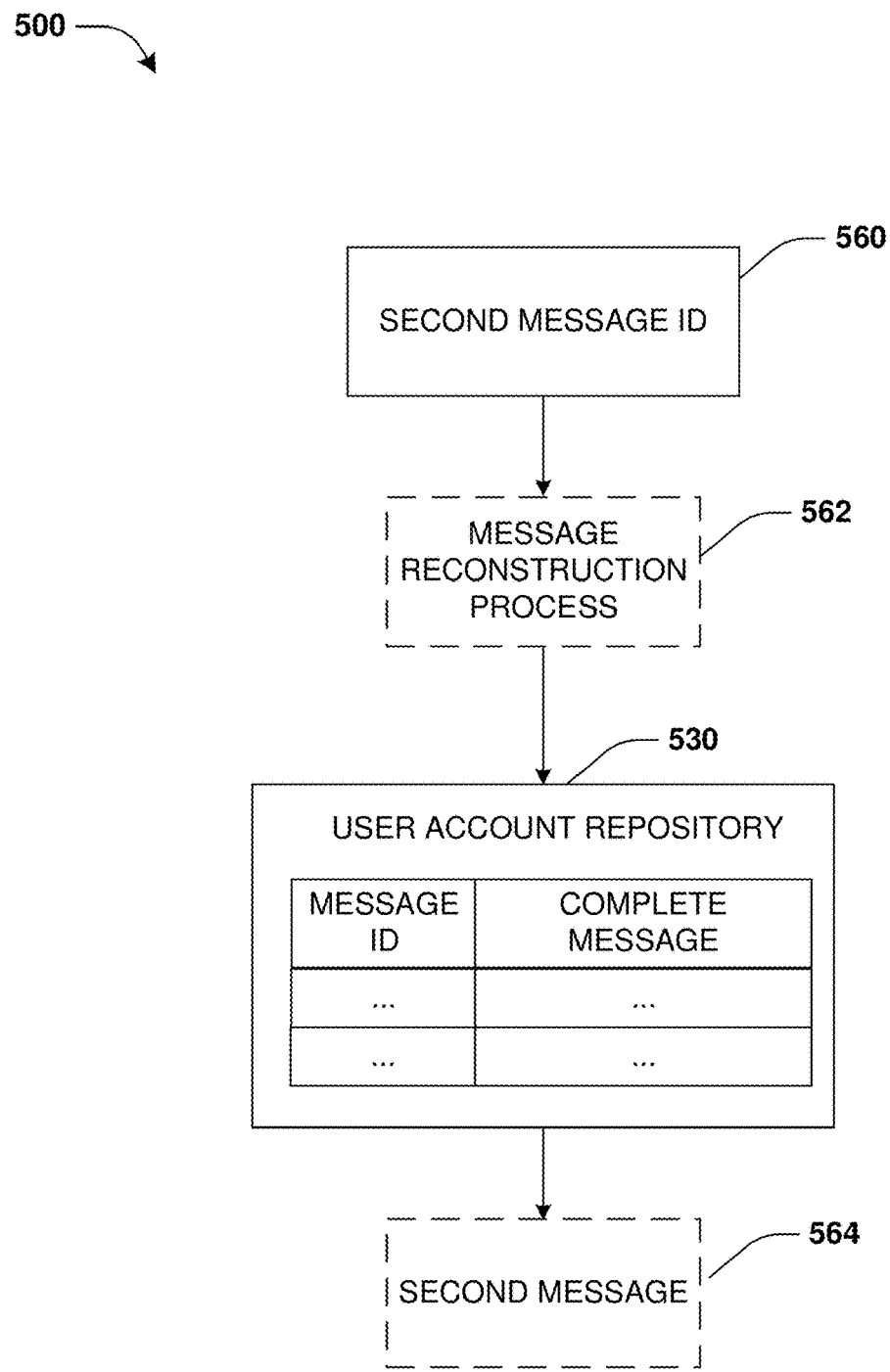
FIG. 5F is a component block diagram illustrating an example system for efficient storage and retrieval of electronic messages, where a message is retrieved.

FIG. 5F illustrates a second request, comprising a second message identifier 560 of a second message 564, being received by a message reconstruction process 562 (e.g., the user is attempting to read a second saved email of the user account the user has with the messaging service). The second message identifier 560 is used to identify a second entry within the user account repository 530 that matches the second message identifier 560. The entry may comprise the message identifier 560 and the entire content of the second message 564. Accordingly, the second message 564 is reconstructed using the entire content of the second message 564 within the user account repository 530. The second message 564 is provided to the user.

Figure 6:
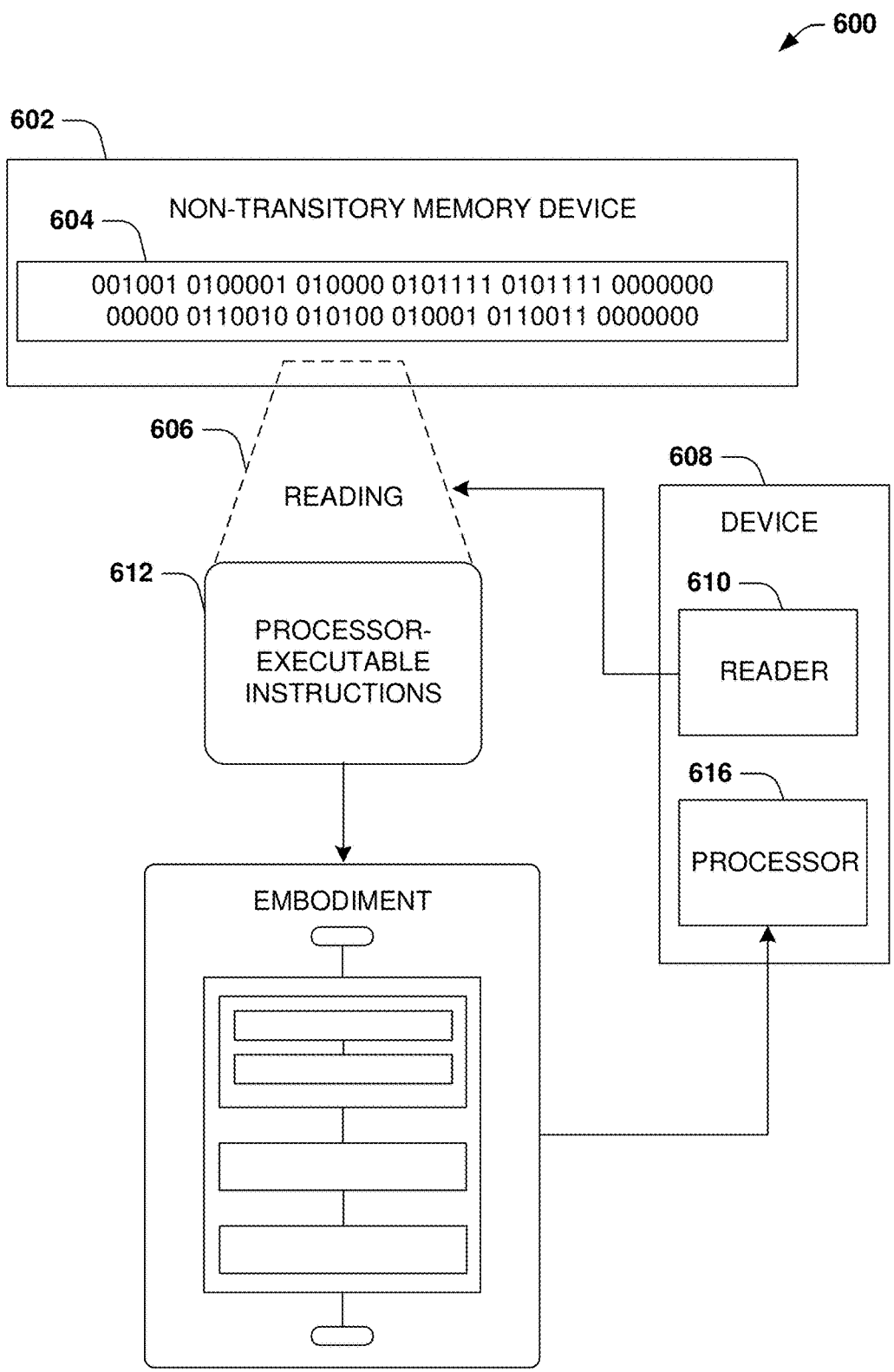
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      receiving a message associated with a user account;
      calculating a signature of the message based upon a structure of the message;
      identifying a cluster from a set of clusters based upon the cluster having a cluster identifier matching the signature;
      evaluating a template of the cluster to identify variable elements and constant elements of the message, wherein the template comprises constant values of the constant elements that are common across messages within the cluster;
      extracting variable values from the message for the variable elements; and
      representing the message within a user account repository for the user account as an entry comprising a message identifier of the message, the cluster identifier, and mappings between element paths of the variable elements and the variable values.

2. The method of claim 1, comprising:
   determining that a second signature of a second message does not match cluster identifiers of clusters within the set of clusters; and
   representing the second message within the user account repository as a second entry comprising a second message identifier of the second message and content of the entire second message.

3. The method of claim 2, comprising
   receiving a request for the second message from a user;
   utilizing the second message identifier to identify the second entry within the user account repository for the second message;
   constructing the second message using the content of the entire second message within the second entry; and
   providing the second message to the user.

4. The method of claim 1, wherein templates for the set of clusters are stored within a general repository.

5. The method of claim 1, wherein the template comprises a list of elemental paths of the variable elements.

6. The method of claim 1, comprising:
   receiving a request for the message from a user;
   utilizing the message identifier to identify the entry within the user account repository for the message;
   utilizing the cluster identifier within the entry to obtain the template, of the cluster, comprising the constant values for the constant elements of the message;

reconstructing the message using the constant values within the template for the constant elements of the message and using the mappings within the entry to populate the variable elements of the message with the variable values mapped to the variable elements by the mappings to create a reconstructed message; and providing the reconstructed message to the user.

7. The method of claim 1, comprising:

determining that a threshold number of messages, having a first signature, are clustered into a first cluster without a template;

generating a structure representing the messages of the first cluster and element paths of elements within the messages of the first cluster;

evaluating the structure to identify constant elements with constant values common amongst the messages of the first cluster and variable elements with variable values different amongst the messages of the first cluster; and generating a new template for the first cluster, wherein the new template comprises element paths of the constant elements, element paths of the variable elements, and the constant values for the constant elements.

8. The method of claim 7, wherein variable values that are different amongst the messages are excluded from the new template.

9. The method of claim 8, wherein variable values of a first message within the first cluster are stored within a first user account repository of a first user account associated with the first message and variable values of a second message within the first cluster are stored within a second user account repository of a second user account associated with the second message.

10. The method of claim 7, wherein the structure comprises rows representing messages, columns representing element paths, and values of element paths for the messages of the first cluster.

11. The method of claim 1, wherein an element path comprises an xpath derived from a document object model tree of nodes representing elements of the message, wherein the xpath comprises a concatenation of tags of nodes from a root node to a leaf node of an element.

12. The method of claim 11, wherein the signature is calculated based upon a hash of xpaths of the message.

13. The method of claim 1, wherein messages having a same document object model structure are clustered into a same cluster.

14. A computing device comprising:

a processor; and memory comprising processor-executable instructions that when executed by the processor cause performance of operations, the operations comprising:

storing variable values of variable elements of a message into an entry within a user account repository for a user account associated with the message;

populating the entry with a message identifier of the message; and populating the entry with a cluster identifier of a cluster assigned the cluster identifier matching a signature of the message, wherein the cluster is associated with a template comprising constant values of constant elements that are common across messages within the cluster and the message.

15. The computing device of claim 14, wherein the operations comprise:

receiving a request for the message; and reconstructing the message using the variable values within the entry of the user account repository and the constant values within the template of the cluster.

16. The computing device of claim 14, wherein messages, having a same signature based upon the messages having a same document object model structure, are clustered into a same cluster.

17. A non-transitory machine readable medium having stored thereon processor-executable instructions that when executed cause performance of operations, the operations comprising:

clustering messages having a same structure into a cluster;

storing variable values of variable elements of a message into an entry within a user account repository for a user account associated with the message; and populating the entry with a message identifier of the message and a cluster identifier of the cluster assigned the cluster identifier matching a signature of the message, wherein the cluster is associated with a template comprising constant values of constant elements that are common across the messages within the cluster and the message.

18. The non-transitory machine readable medium of claim 17, wherein the operations comprise:

receiving a request for the message; and reconstructing the message using the variable values within the entry of the user account repository and the constant values within the template of the cluster.

19. The non-transitory machine readable medium of claim 17, wherein the signature is calculated based upon a hash of xpaths of the message.

20. The non-transitory machine readable medium of claim 17, wherein the template is stored within a general repository.

* * * * *